United States Patent [19]

Liautaud

[11] 3,999,445
[45] Dec. 28, 1976

[54] PINION GEAR

[76] Inventor: James P. Liautaud, River and Bluff Roads, Trout Valley, Cary, Ill. 60013

[22] Filed: July 7, 1975

[21] Appl. No.: 593,576

[52] U.S. Cl. .................................. 74/445; 29/159.2
[51] Int. Cl.² ................... F16H 55/12; B21H 5/00; B21D 53/28
[58] Field of Search ................. 74/434, 445, 446; 29/159.2; 156/86, 250, 228

[56] References Cited

UNITED STATES PATENTS

| 719,572 | 2/1903 | Evenden | 74/445 X |
| 1,662,026 | 3/1928 | Brophy | 74/445 |
| 1,852,957 | 4/1932 | Dalton et al. | 74/445 |
| 2,075,995 | 4/1937 | Morgan | 74/434 |
| 2,516,365 | 7/1950 | Carraher | 74/445 |

FOREIGN PATENTS OR APPLICATIONS

| 198,065 | 9/1967 | U.S.S.R. | 74/434 |

Primary Examiner—Leonard H. Gerin
Attorney, Agent, or Firm—Lockwood, Dewey, Zickert & Alex

[57] ABSTRACT

A high-precision pinion gear comprises a core formed of a plurality of stampings bonded together in axial alignment and having a plurality of relatively low precision teeth formed thereon. A thin plastic layer bonded to the circumference of the core provides a precision plastic surface on which the teeth of the pinion gear are formed with high precision.

4 Claims, 4 Drawing Figures

PINION GEAR

BACKGROUND OF THE INVENTION

This invention relates generally to pinion gears, and more particularly to medium-sized pinion gears having high precision tooth surfaces formed by injection molding techniques.

Heretofore, medium-sized high precision pinion gears have been formed utilizing time consuming and expensive precision machining methods. Attempts at reducing the cost of producing such pinion gears by molding the gears of plastic have been generally successful for gears having a diameter of approximately 1 inch or less, but for gears of larger sizes, e.g. from 1 to 6 inches in diameter, the uneven shrinkage of the molded plastic has prevented the formation of gear teeth with the necessary precision.

With the increasing demand for economical high precision medium-sized gears, a need has arisen for a pinion gear structure which can be produced at lower cost by inexpensive injection molding methods. The present invention is directed to such a pinion gear structure.

It is therefore an object of the present invention to provide a medium size pinion gear having high precision gear teeth formed thereon by less expensive means than present metal machining methods.

It is another object of the invention to provide a high precision pinion gear wherein the gear teeth are formed of plastic by injection molding techniques.

SUMMARY OF THE INVENTION

The invention is directed to a high precision pinion gear comprising rigid core means having a plurality of relatively low-precision gear teeth disposed about the circumference thereof, the diameter of said core means being less than the diameter of the pinion gear, and a thin plastic overmold layer bonded to the circumference of the core, the overmold having a surface of relatively high precision forming the teeth of the pinion gear.

The invention is further directed to an overmolded pinion gear having high precision gear teeth surfaces thereon comprising a plurality of lamina adjacently positioned and bonded together in axial alignment, the lamina each having an outer circumference smaller than the outer circumference of the overmolded gear and a plurality of relatively low precision gear teeth disposed around the circumference thereof each of the lamina being positioned in registration with the gear teeth of adjacent lamina, and a combined thickness which is substantially the thickness of the overmolded gear, and a thin plastic overmold layer formed over and bonded to the teeth on the lamina around the circumference thereof, the plastic overmold layer having an outer surface defining the precision gear teeth of the overmolded pinion gear.

BRIEF DESCRIPTION OF THE DRAWINGS

The features of the present invention, which are believed to be novel, are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
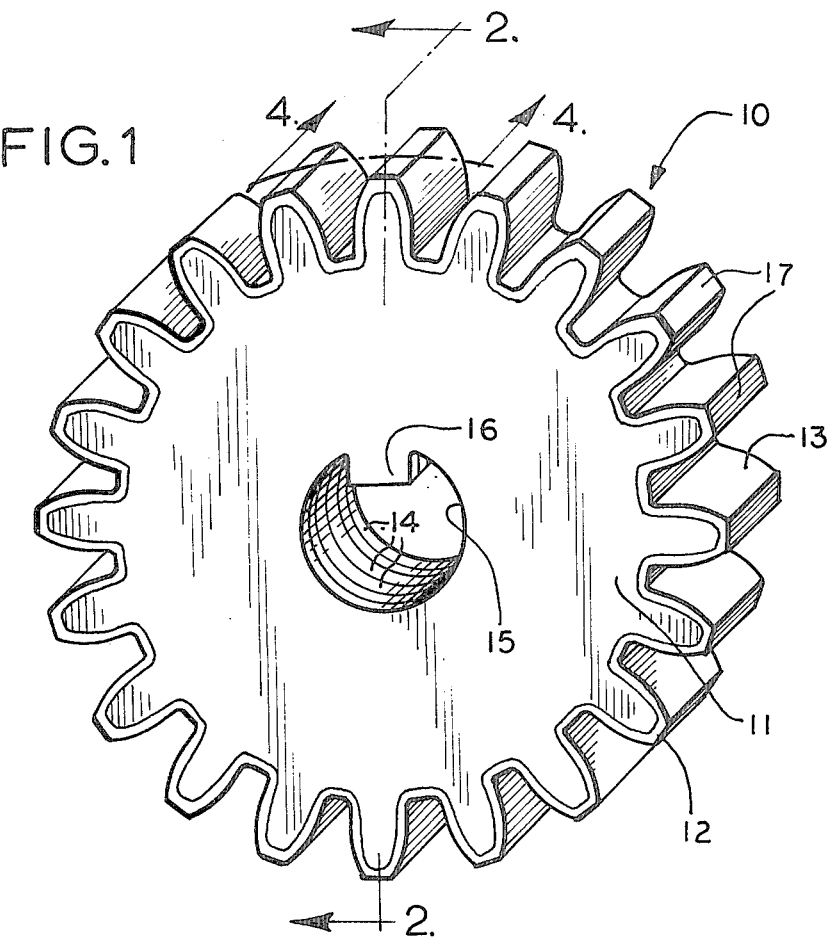
FIG. 1 is a perspective view of a high precision pinion gear constructed in accordance with the present invention.

Referring now to the drawings, and particularly to FIG. 1, there is shown a pinion gear 10 constructed in accordance with the invention. Gear 10 includes a central core 11 of rigid material, preferably metal, and an outer plastic overmold layer 12 around the circumference of the core 11 which has an outer surface 13 forming precision gear teeth surfaces around the circumference of the gear.

In accordance with the invention, relatively high strength and economy of manufacture are achieved for pinion gear 10 by forming core 11 from a plurality of lamina in the form of steel stampings or plates 14. Each of the stampings 14 is identical, within the relatively low tolerances generally associated with stampings, to the other stampings making up the core. The stampings are preferably formed from either heavy sheet or light plate cold rolled steel, and include a central aperture 15 which is circular excepting an inwardly extending rectangular key 16. A plurality of stamped gear teeth 17 of relatively low precision are located about the circumferences of the plates.

Figure 2:
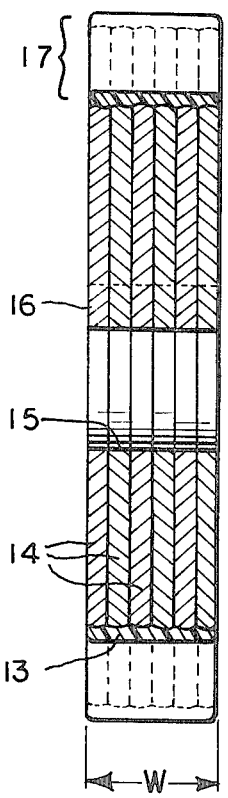
FIG. 2 is a cross-sectional view taken along line 2—2 of FIG. 1.

The central aperture 15 and the key portion 16 is configured to fit a keywayed shaft (not shown). By positioning a plurality of the identical gear stampings 14 upon such a shaft, the gear teeth 17 of each stamping are automatically brought into aligned adjacent registration with the gear teeth 17 of all of the stampings 14 mounted on the shaft. A bonding agent 20 (FIG. 3) may be applied between contiguous sides of the gear plates so that when the plates are pressed together a laminated gear core is formed as shown in FIG. 2. It will be appreciated that any number of stampings 14 may be laminated together to obtain a desired width W for the completed gear structure. The width W of the laminated core 11 may be the width of the final gear 10 or may be smaller than the width of the final gear allowing for a plastic layer to be overmolded on the side surfaces of the gear (not shown).

The laminated core 11 is dimensioned to be of only slightly smaller diameter than the finished gear 10, so that the strong core structure formed by the laminations forms the greater part of the completed gear, in this case approximately 95% thereof. A difference of approximately 0.200 inch or less between the diameter of the core and the diameter of the completed gear assures that the thickness of the plastic layer will be approximately 0.100 inch or less. This avoids uneven shrinkage problems often encountered with large molded plastic structures.

In forming the plastic overmold layer 12 core 11 is positioned in a high precision mold (not shown) having interior cavity dimensions corresponding to the outside dimensions desired for the gear being produced. In order to center the core in the mold during this process the core may again be mounted on a keyed shaft (not shown) and the shaft positioned in the mold. The plastic is then injected into the mold to fill the thin cavity existing between the relatively low-precision gear teeth 17 of the core and the high-precision teeth-forming surfaces of the mold. The plastic layer 12 is then allowed to cure or set, thereby bonding itself to the core to form the low-cost high-precision gear 10 of the invention.

Figure 3:
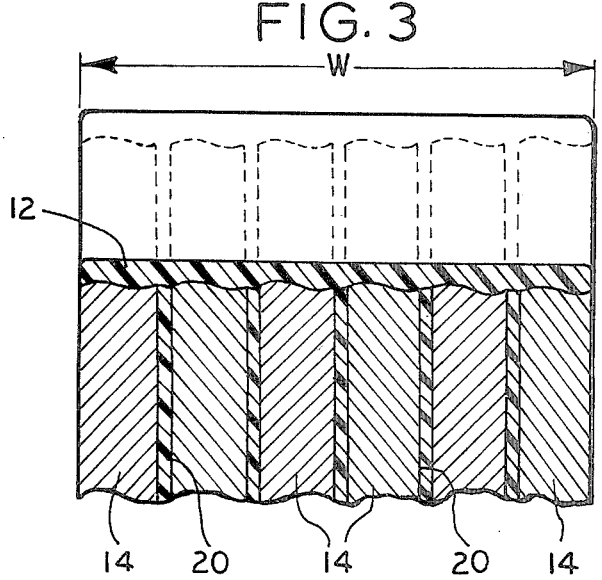
FIG. 3 is an enlarged view of a portion of the gear cross section shown in FIG. 2.
Figure 4:
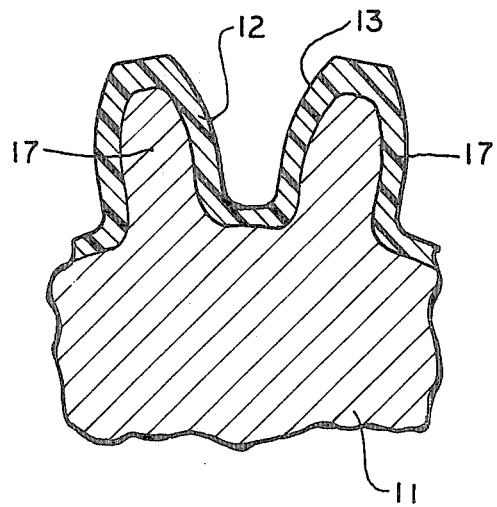
FIG. 4 is an enlarged cross sectional view taken along line 4—4 of FIG. 1.

The molded plastic layer 12 and its bonded relation to the gear core 11 is shown in greater detail in FIGS. 3 and 4. In FIG. 3 it is seen that the circumferential outer surface of core 11 is relatively rough or uneven, being made up of the sheared edges of the stampings 14 and the edges of the layers of bonding agent 20 between the stampings. This provides a surface to which the plastic overmold layer 12 can readily adhere in permanent bonding relationship, the plastic layer 12 filling in the various undulations around the outside surface of the core to produce a high precision, smooth outer gear surface 13. The actual thickness of the plastic overmold layer 12 may vary considerably about the circumference of the gear, in the present embodiment varying between 0.060 and 0.100 of an inch.

In practice the outer surface 13 of the plastic overmold layer 12 may be formed within a tolerance of ±0.001 inch, this precision tolerance being obtainable because the total thickness of the overmold layer does not exceed 0.200 inch. If the entire gear had been molded as a homogeneous plastic structure, the thickness of the overmold would be too great to obtain this high precision outer surface because of the uneven shrinkage properties of the molded plastic.

The stampings 14 which comprise core 11 can be inexpensively formed using low cost metal stamping methods and equipment, and the overmold 12 can be molded to the circumference of the core to form the precision gear tooth surfaces by conventional injection molding techniques. Thus, a high strength medium-sized precision spur gear is formed without the need for expensive metal machining operations.

While one embodiment of the invention has been shown and described, it will be obvious to those skilled in the art that changes and modifications may be made without departing from the invention in its broader aspects. For example, either involute or convolute gears may be formed utilizing an appropriately shaped core 11 and overmolded layer 12. Also, by changing the thickness and number of stampings laminated together to form the core and by altering the angular alignment of their teeth, spiral, helical, and herringbone gears may be formed. Furthermore, the core stampings can be formed of other materials, including metals or non-metals, by conventional stamping techniques. Therefore, the aim in the appended claims is to cover all such changes and modifications as fall within the true spirit and scope of the invention.

I claim:

1. An overmolded pinion gear having high precision gear teeth surfaces thereon comprising, in combination:

a plurality of lamina adjacently positioned and bonded together in axial alignment; said lamina each having an outer circumference smaller than the outer circumference of said overmolded gear and a plurality of relatively low-precision gear teeth disposed around the circumference thereof, each of said lamina being positioned in registration with the gear teeth of adjacent lamina, and a combined thickness which is substantially the thickness of said overmolded gear; and a thin plastic overmold layer formed over and bonded to the teeth on said lamina around the circumference thereof, said plastic overmold layer having an outer surface defining said precision gear teeth of said overmolded pinion gear.

2. An overmolded pinion gear as defined in claim 1 wherein said lamina comprise metal stampings.

3. A plastic overmolded pinion gear as defined in claim 1 wherein the precision tooth surfaces are formed within a tolerance of ±0.001 inch.

4. A plastic overmolded pinion gear as defined in claim 1 wherein said overmold layer is less than 0.100 inch.

* * * * *